United States Patent [19]

Steinmetz

[11] 3,936,392

[45] Feb. 3, 1976

[54] ANTI-CAKING OF POTASSIUM BISULFATE AND RESULTING COMPOSITIONS

[75] Inventor: Walter Edmund Steinmetz, Shreveport, La.

[73] Assignee: Pennzoil Company, Shreveport, La.

[22] Filed: Jan. 17, 1974

[21] Appl. No.: 434,204

[52] U.S. Cl. ..................... 252/385; 71/53; 71/64 E
[51] Int. Cl.² ..................... C09K 3/00; C05B 17/00
[58] Field of Search ............. 71/61, 63, 53, 64 E; 252/381, 385; 423/519, 520, 381, 265, 266, 267, 545, 551

[56] References Cited
UNITED STATES PATENTS

| | | | |
|---|---|---|---|
| 2,082,809 | 6/1937 | Pennell | 71/61 X |
| 2,307,253 | 1/1943 | Yee et al. | 71/64 E X |
| 2,932,556 | 4/1966 | Stephanou | 423/267 |
| 3,419,379 | 12/1968 | Goodale et al. | 252/381 X |

Primary Examiner—Charles N. Hart
Assistant Examiner—Ferris Lander
Attorney, Agent, or Firm—Lowe, King, Price & Markva

[57] ABSTRACT

Potassium bisulfate is prevented from caking by treatment with finely ground phosphate rock.

8 Claims, No Drawings

1

ANTI-CAKING OF POTASSIUM BISULFATE AND RESULTING COMPOSITIONS

BACKGROUND OF THE INVENTION

1. Field of the Invention

This invention relates to a method for the treatment of potassium bisulfate to prevent caking of the dried solid material and to the novel compositions produced by treatment of the bisulfate with phosphate rock.

2. Description of the Prior Art

Potassium bisulfate is a compound of the formula $KHSO_4$ and is known in the art as being useful in various areas including use as an intermediate in the production of certain fertilizers. For example, this compound is disclosed in U.S. Pat. Nos. 3,718,453 and 3,697,246 as a valuable intermediate in the production of fertilizers.

In operation of commercial plants in which potassium bisulfate is used, large quantities of solid potassium bisulfate are necessarily shipped and stored prior to actual use. Potassium bisulfate however, is hygroscopic and therefore has a tendency to cake during storage and shipment which makes it difficult to transfer and use. Accordingly, consideration has been given to developing procedures and methods by which the caking tendency of potassium bisulfate can be prevented in an economic manner without deleteriously affecting the potassium bisulfate. According to the present invention, it has been found that the addition of phosphate rock to solid potassium bisulfate unexpectedly inhibits caking tendencies of potassium bisulfate. This is unexpected in view of the acid nature of potassium bisulfate.

Phosphate rock is a natural product which is a mixture of materials and is considered to have the following formula:

$Ca_9(PO_4)_6 \cdot CaF_2$ and generally comprises calcium phosphates with some fluorides admixed therewith probably in the form of calcium fluoride. This product has also been used in the art to prevent caking of fertilizers including ammonium and potassium salts, calcium nitrates, and the like. The use of phosphate rock as an anti-caking agent of this type is disclosed in U.S. Pat. Nos. 2,008,469 and 2,307,253. In addition, U.S. Pat. No. 3,419,379 discloses use of phosphate rock in a two step treatment for providing coatings on fertilizers such as calcium phosphate although potassium sulfate ($K_2SO_4$) is also mentioned as a plant nutrient.

The present invention, however, is considered to distinguish from these patents and is concerned with a novel composition of matter and an unexpectedly simple procedure for inhibiting the caking tendency of potassium bisulfate by use of phosphate rock.

SUMMARY OF THE INVENTION

It is accordingly one object of this invention to provide a procedure for preventing the caking of potassium bisulfate by the addition of phosphate rock thereto.

A still further object of the invention is to provide a novel composition of matter comprising potassium bisulfate reacted with phosphate rock.

Other objects and advantages of the present invention will become apparent from the following description.

In satisfaction of the foregoing objects and advantages there is provided by this invention a method for the prevention of caking of solid potassium bisulfate which comprises mixing solid potassium bisulfate with phosphate rock in the amount of about 10–400 pounds of rock per ton of potassium bisulfate. On a weight percent basis, this requires that the potassium bisulfate contain about 0.5 to 20 weight percent of phosphate rock and mixing may be carried out in a period of 5 minutes or less. Also provided by this invention is a novel composition of matter comprising solid potassium bisulfate containing a coating on the surface thereof which comprises a reaction product of the potassium bisulfate and phosphate rock and is believed to be a double salt of potassium dihydrogen phosphate and potassium bisulfate.

DESCRIPTION OF PREFERRED EMBODIMENTS

According to this invention it has been found that the caking tendency of potassium bisulfate in solid form may be minimized by the addition thereto of a small amount of phosphate rock. Thus, it has been found that the addition of about 10–400 and preferably about 30–60 pounds of phosphate rock per ton of $KHSO_4$ over a very short period of time substantially reduces hygroscopic tendencies of the potassium bisulfate so that it remains easily flowable after extended storage.

The phosphate rock mixed with the $KHSO_4$ should be relatively finely ground and have a mesh size of approximately 150 mesh or less.

Potassium bisulfate of course is a known product in the art and may be prepared by various methods including the reaction of potassium chloride and sulfuric acid with evolution of hydrogen chloride. This invention pertains to potassium bisulfate in its solid form and may be applied at any stage. A particularly useful stage for application of the procedure of this invention is when the potassium bisulfate is being removed from the dryer for storage or shipment. In this invention, at this stage about 10–400 lbs. of finely divided phosphate rock per ton of $KHSO_4$ are added to the potassium bisulfate and the mixture is agitated for five minutes or less. The phosphate rock may be added at any temperature or at any point but is preferably added while the $KHSO_4$ is at or above room temperature, e.g. about 30°–150°C. and before caking of the $KHSO_4$ begins. After the phosphate rock is added, the resulting mixture is then ready for shipment and/or storage.

In conducting the process, it should be noted that the effectiveness of the phosphate rock in inhibiting caking of the potassium bisulfate falls within the critical range of about 10–400 pounds per ton of potassium bisulfate or about 0.5 to 20.0 weight percent. In fact a highly preferred range is 30–60 lbs. per ton of $KHSO_4$ per ton of rock or about 1.5 to 3.0 weight percent and it is this range at which maximum effectiveness is attained. Contrary to the teachings of U.S. Pat. No. 2,008,469, further increases in the quantity of this anti-caking agent do not contribute to increase the activity. For example, data indicates that at a rate of above about 30–60 pounds per ton of $KHSO_4$, the effectiveness of anti-caking agent falls off slightly from the value obtained at 30 to 60 pounds per ton of $KHSO_4$. Thus, the range of 30 to 60 pounds per ton of solid $KHSO_4$ or 1.5 to 3.0 weight percent of finely ground phosphate rock is considered to provide maximum effectiveness.

This invention also provides novel compositions which result from addition of the anti-caking amount of phosphate rock to the potassium bisulfate. Thus, it has been found that when the phosphate rock is added to the KHSO$_4$, a reaction appears to occur at least on the coated surface of the KHSO$_4$, and this reaction appears to be the reaction product of potassium bisulfate and the phosphate rock. This reaction product is believed to be a double salt of potassium dihydrogen phosphate and potassium bisulfate. Certainly this reaction product is less hygroscopic than the KHSO$_4$. Therefore, the present invention also includes a novel composition of matter comprising a mixture of potassium bisulfate and phosphate rock and containing an exterior surface coating comprising the double salt of potassium dihydrogen phosphate and potassium bisulfate.

While Applicant does not exactly understand the exact reactions which occur, it is considered that the final product is potassium bisulfate containing phosphate rock and the double salt KH$_2$PO$_4$·3KHSO$_4$ as a surface coating. Accordingly, the present invention provides a novel composition of matter and method for its production.

The novel composition of this invention is a useful composition as it is an intermediate in the production of potassium dihydrogen phosphate fertilizers as taught in U.S. Pat. No. 3,697,246. The phosphate rock and reaction products with the KHSO$_4$ easily enter into the reaction and further, by inhibiting caking of the KHSO$_4$, renders the composition a useful intermediate.

The following examples are presented to illustrate the invention but it is not to be considered as limited thereto. In these examples and throughout the specification parts are by weight unless otherwise indicated.

EXAMPLES 1 TO 26

The equipment used in these examples consisted of a balance and a number of 4 oz. wide mouth clear glass jars with plastic screw caps. First the desired amount of anti-caking agent was weighed into the jars after which 50 grams of dry, hot (approximately 125°C.) potassium bisulfate was added. The jars were then capped and shaken for five minutes on a mechanical shaker after which the caps were removed and the jars placed in a desiccator containing water at approximately 25°C. (room temperature) for 2-½ hours. The jars were then recapped, shaken once and allowed to stand undisturbed at room temperature. After 24, 72, 168 and 360 hours the samples were evaluated for caking tendencies in the following manner: the capped sample bottle was slowly upended and each sample graded as shown below:

| Grade No. | Description | Sample Condition |
|---|---|---|
| 1 | Completely free flowing when jar was inverted 0–95° | Excellent |
| 1½ | Crystals separated when jar was inverted 95–135° | Very Good |
| 2 | Slightly caked: crystals separated when jar was inverted 135–180° | Good |
| 3 | Caked: jar required light tap to separate crystals | Fair |
| 4 | Firmly caked: jar required several taps to separate crystals | Poor |
| 5 | Solidly caked: jar required hard rap to separate crystals | Very Poor |
| 6 | Hard cake: jar required several hard raps to separate crystals | Extremely Poor |

With minor variations the above is the evaluation system used by Armour Industrial Chemical Company to evaluate anti-caking agents as described hereinabove.

At the end of the 360 hour storage period, the caps were removed from the jars which were allowed to stand exposed to laboratory air for an additional week (528 hours) after which they were again evaluated. The results are shown in Table I.

It was found from these Examples that Western Phosphate rock as received at a concentration of 30 to 60 pounds per ton provided effective anti-caking protection for the potassium bisulfate. Phosphate rocks from other locations (Florida and Spain) also provided good protection if their particle sizes were comparable to that of the Western rock. The Florida and Spanish rock (Calidad 80% rock) as received, however, were too coarse to be effective anti-caking agents for the potassium bisulfate. The attached Table II shows the screen analyses of the Western, Florida and Spanish rocks as received and the latter two after grinding in a mortar. These "ground" rocks were approximately equivalent to the Western rock in anti-caking activity on potassium bisulfate at equivalent concentrations.

Table I

| Example No. | Treatment | EVALUATION OF ANTICAKING AGENTS ON POTASSIUM BISULFATE Grade Number After | | | | |
|---|---|---|---|---|---|---|
| | | 24 hrs. | 72 hrs. | 168 hrs. | 360 hrs. | 528 hrs. [1] |
| 1 | None | 5 | 6 | 6 | 4 | 5 |
| 2 | 0.25g. Western Rock (10 lb./ton) | 3 | 1½ | 1½ | 1 | 1½ |
| 3 | 0.75g. Western Rock (30 lb/ton) | 2 | 1 | 1 | 1 | 1 |
| 4 | 1.50g. Western Rock (60 lb/ton) | 2 | 1 | 1 | 1 | 1½ |
| 5 | 2.50g. Western Rock (100 lb/ton) | 3 | 1½ | 1½ | 1½ | 1½ |
| 6 | 5.00g. Western Rock (200 lb/ton) | 2 | 1½ | 1½ | 1½ | 1½ |
| 7 | 10.00g. Western Rock (10 lb/ton) | 2 | 1½ | 1 | 1½ | 1½ |
| 8 | 0.25g. Occidental Florida Rock (10 lb/ton) | 5 | 4 | 3 | 3 | 3 |
| 9 | 0.75g. Occidental Florida Rock (30 lb/ton) | 6 | 5 | 4 | 3 | 3 |
| 10 | 1.50g. Occidental Florida Rock (60 lb/ton) | 5 | 6 | 4 | 3 | 3 |
| 11 | 2.50g. Occidental Florida Rock (100 lb/ton) | 5 | 5 | 3 | 3 | 3 |
| 12 | 5.00g. Occidental Florida Rock (200 lb/ton) | 5 | 5 | 4 | 3 | 3 |
| 13 | 0.25g. Calidad 75% Rock (10 lb/ton) | 5 | 5 | 3 | 3 | 3 |
| 14 | 0.75g. Calidad 75% Rock (30 lb/ton) | 4 | 3 | 3 | 3 | 3 |
| 15 | 1.50g. Calidad 75% Rock (60 lb/ton) | 4 | 3 | 2 | 3 | 3 |
| 16 | 2.50g. Calidad 75% Rock (100 lb/ton) | 4 | 4 | 3 | 1½ | 1½ |
| 17 | 5.00g. Calidad 75% Rock (200 lb/ton) | 4 | 3 | 3 | 3 | 1½ |
| 18 | 0.25g. Calidad 80% Rock (10 lb/ton) | 5 | 5 | 3 | 3 | 3 |
| 19 | 0.75g. Calidad 80% Rock (30 lb/ton) | 4 | 3 | 1½ | 1½ | 3 |
| 20 | 1.50g. Calidad 80% Rock (60 lb/ton) | 4 | 4 | 4 | 3 | 3 |
| 21 | 2.50g. Calidad 80% Rock (100 lb/ton) | 3 | 3 | 3 | 3 | 1½ |
| 22 | 5.00g. Calidad 80% Rock (200 lb/ton) | 3 | 3 | 1½ | 1½ | 1½ |
| 23 | 0.75g. Ground Occidental Florida Rock (30 lb/ton) | 3 | 1½ | 1 | 1 | 1 |
| 24 | 2.50g. Ground Occidental Florida Rock (100 lb/ton) | 3 | 1½ | 1 | 1 | 1 |
| 25 | 0.75g. Ground Calidad 80% Rock (30 lb/ton) | 3 | 1½ | 1½ | 1 | 1 |

Table I-continued

EVALUATION OF ANTICAKING AGENTS ON POTASSIUM BISULFATE

| Example No. | Treatment | Grade Number After 24 hrs. | 72 hrs. | 168 hrs. | 360 hrs. | 528 hrs.[1] |
|---|---|---|---|---|---|---|
| 26 | 2.50g. Ground Calidad 80% Rock (100 lb/ton) | 3 | 1½ | 1 | 1½ | 1 |

[1] From 360 hours to 528 hours sample jars were uncapped and exposed to laboratory air.

TABLE II

SCREEN ANALYSES OF PHOSPHATE ROCKS EVALUATED AS ANTICAKING AGENTS
Weight Percent of Sample on Screen

| Screen No. | Diameter Hole(in.) | Western Rock | Occidental Florida Rock | Ground Occidental Florida Rock | Calidad 80% Rock | Ground Calidad 80% Rock |
|---|---|---|---|---|---|---|
| 60 | 0.0098 | 11.0 | 63.3 | 22.0 | 15.7 | 11.3 |
| 100 | 0.0059 | 21.7 | 32.7 | 35.3 | 41.7 | 43.0 |
| 140 | 0.0041 | 16.7 | 3.0 | 12.3 | 28.7 | 22.0 |
| 170 | 0.0035 | 20.3 | 0.3 | 5.3 | 6.3 | 5.7 |
| 200 | 0.0029 | 8.3 | 0.3 | 1.0 | 1.3 | 2.3 |
| Pan | <0.0029 | 21.3 | 0.7 | 23.7 | 4.0 | 15.3 |
| Loss | — | 0.7 | −0.3 | 0.4 | 2.3 | 0.4 |

EXAMPLES 27–30

The equipment used was the same as described in Examples 1–36 but the procedure was varied slightly. After the dry hot (approximately 125°C.) reagent grade potassium bisulfate had been mixed with the desired amount of phosphate rock, the jars were weighed on an analytical balance and stored uncapped in the laboratory. One bottle for comparison was capped and stored with the uncapped samples. This capped sample was presumedly dry since it had been protected from atmospheric moisture at all times since it was placed in the jar.

Before each evaluation the jars were reweighed to determine any weight change. The temperature and humidity conditions in the laboratory were monitored during this experimentation and an average value recorded for each evaluation period. The method of evaluating the sample was the same as that described in Examples 1–26.

After the storage period was completed, representative stored samples were treated with $H_2O$ to dissolve the potassium bisulfate, and the insoluble anti-caking agent (Western phosphate rock) recovered, dried and analyzed. Representative stored samples were also analyzed by X-ray diffraction.

The results of these tests are shown in the following Table III. As will be noted, the untreated sample caked badly and gained weight (water) at a diminishing rate up to 360 hours. After this time, the sample lost some weight up to 600 hours, but it will be noted that during this time the average relative humidity of the air in the laboratory dropped. As there was doubtless an equilibrium between the amount of water picked up by the potassium bisulfate and the amount present in the air surrounding it, the sample could be expected to lose weight during this time period.

TABLE III

EVALUATION OF WESTERN PHOSPHATE ROCK AS AN ANTICAKING AGENT FOR REAGENT GRADE POTASSIUM BISULFATE

| Treatment | | 27 None Sample open to atmosphere | 28 Western Rock at 30 lbs/T Open to atmosphere | 29 Western Rock at 60 lbs/T Open to atmosphere | 30 Western Rock at 60 lbs/T Closed to atmosphere |
|---|---|---|---|---|---|
| Grade No. after | 24 hrs. | 5 (Very Poor) | 2 (Good) | 4 (Poor) | 1 (Excellent) |
| | 96 hrs. | 5 (Very Poor) | 5 (Very Poor) | 1 (Excellent) | 4 (Poor) |
| | 192 hrs. | 4 (Poor) | 4 (Poor) | 1 (Excellent) | 3 (Fair) |
| | 360 hrs. | 5 (Very Poor) | 3 (Fair) | 1 (Excellent) | 1 (Excellent) |
| | 528 hrs. | 5 (Very Poor) | 1 (Excellent) | 1 (Excellent) | 1 (Excellent) |
| | 600 hrs. | 4 (Poor) | 1 (Excellent) | (Excellent) | 1 (Excellent) |
| Weight gain (loss) after | 24 hrs. | 0.2124 g. | 0.0553 g. | 0.0293 g. | 0.0078 g. |
| | 96 hrs. | 0.0308 | −(0.0089) | −(0.0038) | 0.0032 |
| | 192 hrs. | 0.0188 | −(0.0083) | −(0.0037) | 0.0089 |
| | 360 hrs. | 0.0052 | −(0.0040) | −(0.0002) | 0.0026 |
| | 528 hrs. | −(0.0283) | −(0.0063) | −(0.0035) | −(0.0134) |
| | 600 hrs. | −(0.0070) | −(0.0041) | −(0.0031) | −(0.0071) |
| Total gain (loss) | | 0.2319 g. | 0.0237 g. | 0.0150 g. | 0.0020 g. |
| Temp. (F°) and Rel. Humidity after | 24 hrs. | 74°; 54% | 74°; 54% | 74°; 54% | — |
| | 96 hrs. | 74°; 56% | 74°; 56% | 74°; 56% | — |
| | 192 hrs. | 75°; 55% | 75°; 55% | 75°; 55% | — |
| | 360 hrs. | 75°; 57% | 75°; 57% | 75°; 57% | — |
| | 528 hrs. | 75°; 52% | 75°; 52% | 75°; 52% | — |
| | 600 hrs. | 76°; 51% | 76°; 51% | 76°; 51% | — |

The results obtained with the three samples treated with Western phosphate rock in this Example were somewhat different from those of Examples 1–26. In the prior examples, the samples were exposed for 2.5 hours to air of approximately 100 percent relative humidity at 25°C. (77°F.) before being capped and stored. In the present Example, the samples were only exposed to laboratory air of the average temperatures and humidities shown in the table. In this Example, the sample treated with Western phosphate rock at 30 pounds per ton initially showed a "good" caking rating which fell off at 96 hours storage to the same value as the untreated sample, but thereafter slowly improved until it became "excellent" at the end of the test. The sample treated with 60 pounds per ton of Western phosphate rock showed a "poor" caking rating after 24 hours storage, but thereafter was "excellent" throughout the duration of the test.

The treated sample which was closed to the atmosphere initially showed an excellent caking tendency, which fell off at 96 hours to a poor rating, but thereafter recovered to again become excellent from the 360 hour rating onward.

It will be noted that both treated samples open to the atmosphere initially picked up weight, but thereafter began losing weight. It will also be noted that the overall weight gain was greatest for the untreated sample; less for the sample treated at 30 pounds/ton and least for the sample treated at 60 pounds/ton with Western phosphate rock and open to the atmosphere. The treated sample closed to the atmosphere gained small amounts of weight on the first four evaluations and then lost much of this weight during the last two evaluations. The reason for this is not known but it was probably due to adsorption and desorption of water on the surfaces of the glass jar and its plastic top due to changing humidity conditions.

If we assume that all samples open to the atmosphere at least initially picked up the same amount of water, the subsequent loss of weight of the treated samples can only be due to (1) the loss of a volatile substance due to a chemical reaction and/or (2) the loss of water from a reaction product of potassium bisulfate and phosphate rock which was less hygroscopic than potassium bisulfate and hence would more easily lose water to the atmosphere.

To test the first hypothesis, at the conclusion of the storage test 25 grams of the potassium bisulfate treated with 60 pounds per ton of Western phosphate rock was treated with 100 cc of water to dissolve the potassium bisulfate. The residual phosphate rock was collected, washed with 10 cc of water, dried and analyzed for fluorides on the theory that hydrogen fluoride may have been lost. The weight percent of fluorides in the original Western phosphate rock was found to be 3.0 percent, and that found in the rock recovered from the sample treated with 60 pounds/ton of rock and left open to the atmosphere was found to be 2.27 percent. Surprisingly, rock recovered from the potassium bisulfate sample treated with 60 pounds/ton of Western phosphate rock which was closed to the atmosphere was found to have a fluoride concentration of 2.09 percent by weight.

To test the hypothesis that a chemical reaction had occurred with formation of new compounds during the storage period, the remaining half of the two samples treated with Western phosphate rock at 60 pounds/ton were analyzed by X-ray diffraction. The fines from both samples, which contained relatively large amounts of the phosphate rock, were used in this analysis. Surprisingly, the analysis of the fines from the sample stored open to the atmosphere and from the sample closed to the atmosphere were the same. Both contained 2–3 weight percent of phosphate rock and 1–3 weight percent of the double salt $KH_2PO_4 \cdot 3KHSO_4$.

From the above analytical data it is obvious that chemical reactions occurred during storage of potassium bisulfate and Western phosphate rock either closed or opened to atmospheric moisture. These chemical reactions were shown to result in the formation of compounds not present in the original components and in the loss of fluorides.

The invention has been described herein with reference to certain preferred embodiments; however, the invention is not to be considered as limited thereto.

What is claimed is:

1. A method for inhibiting caking of a mixture consisting essentially of potassium bisulfate during storage periods in excess of 24 hours which consists essentially of adding thereto and mixing therewith about 0.5 to 20.0 weight percent of finely ground phosphate rock at a temperature of about 30°–150°C. to form a mixture consisting essentially of potassium bisulfate mixed with phosphate rock wherein during the storage period there is formed a generally uniform anti-hygroscopic coating on the potassium bisulfate particles, said coating comprising the reaction product of potassium bisulfate and phosphate rock.

2. A method according to claim 1 wherein the phosphate rock has a particle size of about 150 mesh or less.

3. A method according to claim 2 wherein mixing occurs over a period of 5 minutes or less.

4. A method according to claim 3 wherein mixing occurs at a temperature of about 125°C.

5. A method according to claim 4 wherein about 1.5 to about 3.0 weight percent of phosphate rock is mixed with the potassium bisulfate.

6. A storage stable composition of matter consisting essentially of potassium bisulfate admixed with about 0.5 to 20.0 weight percent of phosphate rock and containing a reaction product of potassium bisulfate and phsophate rock as a generally uniform anti-hygroscopic coating on the bisulfate particles, said reaction product being formed during a storage period.

7. A composition according to claim 6 wherein the reaction product is a double salt of potassium bisulfate and potassium dihydrogen phosphate.

8. A composition according to claim 7 wherein the double salt is of the formula $KH_2PO_4 \cdot 3KHSO_4$.

* * * * *